US012500326B2

(12) United States Patent
Barnes et al.

(10) Patent No.: US 12,500,326 B2
(45) Date of Patent: Dec. 16, 2025

(54) COMPACTIBLE ANTENNA FOR SATELLITE COMMUNICATIONS

(71) Applicant: L'Garde, Inc., Tustin, CA (US)

(72) Inventors: Nathaniel C. Barnes, Irvine, CA (US); Jason G. White, Lake Elsinore, CA (US)

(73) Assignee: L'Garde, Inc., Tustin, CA (US)

( * ) Notice: Subject to any disclaimer, the term of this patent is extended or adjusted under 35 U.S.C. 154(b) by 0 days.

(21) Appl. No.: 17/652,547

(22) Filed: Feb. 25, 2022

(65) Prior Publication Data

US 2022/0181765 A1 Jun. 9, 2022

Related U.S. Application Data

(63) Continuation of application No. PCT/US2020/048848, filed on Aug. 31, 2020.

(Continued)

(51) Int. Cl.
*H01Q 1/08* (2006.01)
*B64G 1/22* (2006.01)
(Continued)

(52) U.S. Cl.
CPC ........... *H01Q 1/085* (2013.01); *B64G 1/2227* (2023.08); *H01Q 1/081* (2013.01); *H01Q 9/28* (2013.01);
(Continued)

(58) Field of Classification Search
CPC ...... H01Q 1/085; H01Q 11/086; H01Q 1/288; H01Q 1/08; H01Q 1/081; H01Q 9/28; H01Q 1/36; B64G 1/222; B64G 1/66
See application file for complete search history.

(56) References Cited

U.S. PATENT DOCUMENTS 3,175,619 A 3/1965 Reed, Jr.
3,354,458 A 11/1967 Rottmayer
(Continued)

FOREIGN PATENT DOCUMENTS

CH 666235 7/1988
CN 102173312 9/2011
(Continued)

OTHER PUBLICATIONS

Extended European Search Report for European Patent Application No. 20798150, dated Dec. 21, 2022, 9 pages.
(Continued)

*Primary Examiner* — Dameon E Levi
*Assistant Examiner* — Yonchan J Kim
(74) *Attorney, Agent, or Firm* — Kari L. Barnes

(57) ABSTRACT

Systems and methods described herein include collapsible and deployable antenna structures including shape memory composite components. An example antenna structure includes a base structure comprising a shape memory component; a conductive component; and a support structure creating an inflatable sleeve. The support structure may be configured to support the conductive material and the base structure. The support structure and base structure may work together to deploy the deployable antenna from the collapsed configuration to the deployed configuration. An exemplary method of deploying an antenna structure may include storing the antenna structure in a stored configuration; inflating an inflatable sleeve with an inflation gas to transition the antenna structure from the stored configuration to a deployed configuration defining an antenna shape; and retaining the deployed configuration defining the antenna shape with the shape memory component.

21 Claims, 5 Drawing Sheets

Related U.S. Application Data

(60) Provisional application No. 62/894,600, filed on Aug. 30, 2019.

(51) Int. Cl.

| | |
|---|---|
| ***H01Q 1/36*** | (2006.01) |
| ***H01Q 9/28*** | (2006.01) |
| ***H01Q 11/08*** | (2006.01) |
| *H01Q 1/28* | (2006.01) |

(52) U.S. Cl.
CPC ........... *H01Q 11/086* (2013.01); *H01Q 1/288* (2013.01); *H01Q 1/36* (2013.01)

(56) References Cited

U.S. PATENT DOCUMENTS

| | | | | |
|---|---|---|---|---|
| 3,521,290 | A | 7/1970 | Bahiman et al. | |
| 3,780,375 | A | 12/1973 | Cummings et al. | |
| 3,959,622 | A | 5/1976 | Bogdanov et al. | |
| 4,033,225 | A | 7/1977 | Kartzmark, Jr. | |
| 4,092,453 | A | 5/1978 | Jonda | |
| 4,171,876 | A | 10/1979 | Wood | |
| 4,195,416 | A | 4/1980 | Hall | |
| 4,262,867 | A | 4/1981 | Piening | |
| 4,475,323 | A | 10/1984 | Schwartzberg et al. | |
| 4,557,083 | A | 12/1985 | Zanardo | |
| 4,579,302 | A | 4/1986 | Schneider | |
| 4,587,777 | A | 5/1986 | Vasques | |
| 4,647,329 | A | 3/1987 | Oono | |
| 4,745,725 | A | 5/1988 | Onoda | |
| 4,759,517 | A | 7/1988 | Clark | |
| 4,802,417 | A | 2/1989 | Chen | |
| 4,820,170 | A | 4/1989 | Redmond et al. | |
| 4,852,307 | A | 8/1989 | Goudeau | |
| 5,042,390 | A | 8/1991 | Schotter | |
| 5,085,018 | A | 2/1992 | Kitamura et al. | |
| 5,163,262 | A | 11/1992 | Adams | |
| 5,184,444 | A | 2/1993 | Warden | |
| 5,351,417 | A | 10/1994 | Rubin | |
| 5,451,975 | A | 9/1995 | Miller | |
| 5,507,451 | A | 4/1996 | Karnish | |
| 5,615,847 | A | 4/1997 | Bourlett | |
| 5,680,145 | A | 10/1997 | Thomson et al. | |
| 5,979,833 | A | 11/1999 | Eller | |
| 6,028,570 | A | 2/2000 | Gilger et al. | |
| 6,260,797 | B1 | 7/2001 | Palmer | |
| 6,286,410 | B1 | 9/2001 | Leibolt | |
| 6,311,015 | B1 | 10/2001 | Shih | |
| 6,323,827 | B1 | 11/2001 | Gilger et al. | |
| 6,508,036 | B1 * | 1/2003 | Cadogan | B64G 1/645 52/750 |
| 6,568,640 | B1 | 5/2003 | Barnett | |
| 6,640,739 | B2 | 11/2003 | Woodall | |
| 6,647,668 | B1 | 11/2003 | Choee et al. | |
| 6,655,637 | B1 | 12/2003 | Robinson | |
| 6,830,222 | B1 * | 12/2004 | Nock | B64G 1/242 244/110 D |
| 6,904,722 | B2 | 6/2005 | Brown | |
| 7,104,507 | B1 | 9/2006 | Knight | |
| 7,337,097 | B2 | 2/2008 | Ih | |
| 7,941,978 | B1 | 5/2011 | Pollard | |
| 8,056,461 | B2 | 11/2011 | Bossert | |
| 8,115,149 | B1 | 2/2012 | Manole | |
| 8,356,774 | B1 | 1/2013 | Banik et al. | |
| 8,511,298 | B2 | 8/2013 | Ven | |
| 8,770,522 | B1 | 7/2014 | Murphey et al. | |
| 9,146,043 | B2 | 9/2015 | Pedretti | |
| 9,187,191 | B1 | 11/2015 | Jensen | |
| 9,296,270 | B2 | 3/2016 | Parks | |
| 9,499,285 | B2 | 11/2016 | Garber | |
| 9,666,948 | B1 | 5/2017 | Rao et al. | |
| 9,666,950 | B1 | 5/2017 | Johnson et al. | |
| 9,742,058 | B1 | 8/2017 | O'Neil, Jr. | |
| 9,755,318 | B2 | 9/2017 | Mobrem | |
| 9,810,820 | B1 | 11/2017 | Starkovich | |
| 9,828,772 | B2 | 11/2017 | Murphey et al. | |
| 10,036,878 | B2 | 7/2018 | Greschik | |
| 10,347,962 | B1 | 7/2019 | Georgakopoulos | |
| 10,642,011 | B2 | 5/2020 | Greschik et al. | |
| 10,651,531 | B2 | 5/2020 | Palisoc et al. | |
| 10,774,518 | B1 | 9/2020 | Eller | |
| 11,142,349 | B2 | 10/2021 | Barnes | |
| 11,316,242 | B2 | 4/2022 | Palisoc et al. | |
| 11,358,738 | B1 | 6/2022 | Eller et al. | |
| 11,713,141 | B2 | 8/2023 | Barnes | |
| 11,870,128 | B2 | 1/2024 | Palisoc et al. | |
| 11,905,044 | B2 | 2/2024 | Barnes et al. | |
| 11,973,258 | B2 | 4/2024 | Bolisay | |
| 2002/0112417 | A1 | 8/2002 | Brown | |
| 2002/0116877 | A1 | 8/2002 | Breitbach et al. | |
| 2003/0010869 | A1 | 1/2003 | Kawaguchi | |
| 2003/0010870 | A1 | 1/2003 | Chafer | |
| 2003/0132543 | A1 | 7/2003 | Gardner | |
| 2003/0195499 | A1 | 10/2003 | Prakash et al. | |
| 2004/0085615 | A1 | 5/2004 | Hill | |
| 2004/0140402 | A1 | 7/2004 | Wehner | |
| 2004/0148901 | A1 | 8/2004 | Cadogan et al. | |
| 2004/0194397 | A1 | 10/2004 | Brown | |
| 2005/0103939 | A1 | 5/2005 | Bischof et al. | |
| 2005/0104798 | A1 | 5/2005 | Nolan et al. | |
| 2005/0126106 | A1 | 6/2005 | Murphy | |
| 2005/0168393 | A1 * | 8/2005 | Apostolos | H01Q 5/40 343/773 |
| 2005/0209835 | A1 | 9/2005 | Ih | |
| 2007/0008232 | A1 * | 1/2007 | Weinstein | H01Q 1/34 343/709 |
| 2007/0145195 | A1 | 6/2007 | Thomson | |
| 2008/0035798 | A1 | 2/2008 | Kothera | |
| 2008/0228332 | A1 | 9/2008 | Hindle | |
| 2009/0001219 | A1 | 1/2009 | Golecki et al. | |
| 2009/0002257 | A1 * | 1/2009 | de Jong | H01Q 1/428 244/158.3 |
| 2009/0114271 | A1 | 5/2009 | Stancel | |
| 2009/0124743 | A1 | 5/2009 | Lee | |
| 2009/0294595 | A1 | 12/2009 | Pellegrino | |
| 2010/0018026 | A1 | 1/2010 | Bassily | |
| 2010/0094272 | A1 * | 4/2010 | Rossetto | A61B 18/1815 606/33 |
| 2010/0320185 | A1 | 12/2010 | Springer et al. | |
| 2011/0023484 | A1 | 2/2011 | Lu | |
| 2011/0252716 | A1 | 10/2011 | Pedretti | |
| 2012/0097799 | A1 | 4/2012 | Stone | |
| 2012/0205488 | A1 | 8/2012 | Powell | |
| 2012/0297717 | A1 | 11/2012 | Keller et al. | |
| 2012/0313569 | A1 | 12/2012 | Curran | |
| 2013/0069833 | A1 | 3/2013 | Lippincott | |
| 2013/0101845 | A9 | 4/2013 | Hiel | |
| 2013/0114155 | A1 | 5/2013 | Eguro | |
| 2013/0175401 | A1 | 7/2013 | Starke et al. | |
| 2013/0207881 | A1 | 8/2013 | Fujii et al. | |
| 2013/0292518 | A1 | 11/2013 | Lagadec | |
| 2014/0030455 | A1 | 1/2014 | Ruschulte | |
| 2014/0042275 | A1 | 2/2014 | Abrams et al. | |
| 2014/0099853 | A1 | 4/2014 | Condon | |
| 2014/0151485 | A1 | 6/2014 | Baudasse et al. | |
| 2015/0194733 | A1 | 7/2015 | Mobrem | |
| 2015/0336685 | A1 | 11/2015 | Wan | |
| 2016/0046372 | A1 | 2/2016 | Barnes et al. | |
| 2016/0054097 | A1 | 2/2016 | Sylvia | |
| 2016/0130020 | A1 | 5/2016 | Chambert | |
| 2016/0136820 | A1 | 5/2016 | Lessing | |
| 2016/0159475 | A1 | 6/2016 | Schank | |
| 2016/0288453 | A1 | 10/2016 | Mejia-Ariza | |
| 2016/0311558 | A1 | 10/2016 | Turse | |
| 2016/0361910 | A1 | 12/2016 | Franck, III | |
| 2017/0058524 | A1 | 3/2017 | Fernandez | |
| 2017/0298718 | A1 | 10/2017 | Mills et al. | |
| 2017/0310014 | A1 | 10/2017 | Liu et al. | |
| 2018/0151938 | A1 * | 5/2018 | Rudys | H01Q 1/288 |
| 2018/0257795 | A1 | 9/2018 | Ellinghaus | |
| 2019/0036221 | A1 * | 1/2019 | Muesse | H01Q 1/362 |
| 2019/0097300 | A1 * | 3/2019 | Palisoc | B64G 1/222 |
| 2019/0144141 | A1 | 5/2019 | Barnes | |

(56) References Cited

U.S. PATENT DOCUMENTS

| | | | |
|---|---|---|---|
| 2020/0130872 | A1 | 4/2020 | Spencer |
| 2021/0159604 | A1 | 5/2021 | Palisoc et al. |
| 2022/0181765 | A1 | 6/2022 | Barnes et al. |
| 2022/0388694 | A1 | 12/2022 | Barnes |
| 2022/0402632 | A1 | 12/2022 | Yamamoto et al. |
| 2023/0155545 | A1 | 5/2023 | Bolisay et al. |
| 2023/0399847 | A1 | 12/2023 | Greschik et al. |
| 2024/0025568 | A1 | 1/2024 | Barnes |
| 2024/0088539 | A1 | 3/2024 | Palisoc et al. |
| 2024/0109265 | A1 | 4/2024 | Palisoc et al. |

FOREIGN PATENT DOCUMENTS

| | | | | | |
|---|---|---|---|---|---|
| CN | 104393421 | | | 3/2015 | |
| CN | 204216229 | | | 3/2015 | |
| CN | 104691784 | | | 6/2015 | |
| CN | 106516164 | | | 3/2017 | |
| CN | 105480436 | | | 7/2017 | |
| CN | 106976571 | | | 7/2017 | |
| CN | 107150818 | | | 9/2017 | |
| CN | 109449559 | A | * | 3/2019 | ............. H01Q 1/081 |
| CN | 111806723 | | | 11/2021 | |
| CN | 110371324 | | | 3/2022 | |
| CN | 112389683 | | | 5/2022 | |
| DE | 1456133 | | | 6/1965 | |
| DE | 3437824 | | | 4/1986 | |
| DE | 10147144 | | | 2/2003 | |
| DE | 102011082497 | | | 3/2013 | |
| EP | 524888 | | | 1/1993 | |
| FR | 3081842 | | | 12/2019 | |
| GB | 2322236 | | | 8/1998 | |
| JP | 60125003 | | | 7/1985 | |
| JP | 1997277996 | | | 10/1997 | |
| JP | 2001196844 | | | 7/2001 | |
| JP | 2002362500 | | | 12/2002 | |
| JP | 2004221897 | | | 8/2004 | |
| JP | 2014189145 | | | 10/2014 | |
| JP | 2016030486 | | | 3/2016 | |
| JP | 2018104250 | | | 7/2018 | |
| WO | 20120092933 | | | 7/2012 | |
| WO | 20150116280 | | | 8/2015 | |
| WO | 20170151689 | | | 9/2017 | |
| WO | WO-2020249900 | A1 | * | 12/2020 | ........... B29C 61/003 |
| WO | 20210224572 | | | 11/2021 | |
| WO | 20220109575 | | | 5/2022 | |

OTHER PUBLICATIONS

International Search Report and Written Opinion for PCT/US2021/72477 dated Mar. 25, 2022, 10 pages.

International Search Report and Writen Opinion for PCT/US2022/079841 dated Mar. 10, 2023, 7 pages.

Costanza et al, "Design and Characterization of a Small-Scale Solar Sail Deployed by NiTi Shape Memory Actuators", Jun. 2016, Science Direct, All Pages (2016).

Fu Bo et al: "Solar sail technology—A state of the art review," Progress in Aerospace Sciences, vol. 86, Aug. 3, 2016 (Aug. 3, 2016), pp. 1-19.

Jimenez, "Mechanics of Thin Carbon Fiber Composites With a Silicone Matrix," Thesis (2011) California Institute of Technology, <http://thesis.library.caltech.edu/6271/1/ThesisMain.pdf>.

K.Sonoda, "Materials Application for Spaceraft Use in Japan," in IEEE Electrical Insulation Magazine, vol. 8, No. 2, pp. 18-26, Mar.-Apr. 1992, doi: 10.1109/57.127012. (1992).

B. Siriguleng, W. Zhang, T. Liu, Y.Z Liu, "Vibration Modal Experiments and Modal Interactions of a Large Space Deployable Antenna With Carbon Fiber Material and Ring-Truss Structure," Science Direct, Engineering Structures 207 (2020) https://doi.org/10.1016/j.engstruct.2019.109932, available online Nov. 21, 2019.

* cited by examiner

COMPACTIBLE ANTENNA FOR SATELLITE COMMUNICATIONS

PRIORITY

This application is a continuation of International Application No. PCT/US2020/048848, published as WO2021/042076, filed Aug. 31, 2020, which claims priority to U.S. Provisional Patent Application No. 62/894,600, filed Aug. 30, 2019, each of which is incorporated by reference in its entirety into this application.

BACKGROUND

In recent years, several innovative companies around the globe have pursued a strategy of providing global coverage with large-number small-satellite constellations. These constellations seek to provide several different types of applications, including global internet availability, global commercial imaging capability, and global military situational awareness. A common requirement for these constellations, which may number in the hundreds of SmallSats, is the ability to communicate with the ground and with each other in a virtual network. Since the satellite orientation at deployment is varying and may be unpredictable, the antennas used to send and receive signals preferably operate omnidirectionally.

Typical antennas are rigid structures made from conductive metals. The nominal size of the antenna is conventionally on the order of the radio wave being received, which for S-band frequencies can be as much as 10-15 centimetres. This is the size of a typical U CubeSat that must also contain electronics, cameras, a power source, and other components. This poses logistical problems for the satellite that would preferably be stowed during launch and deployed when in orbit. Such stowable configurations of conventional antennas are difficult given their material construction limitations. As a result, antennas used for small satellites are generally very limited in size. Therefore, the beam pattern of an antenna may be comprised or narrowed to reduce size.

SUMMARY

Antennas and satellites described herein may include a unique Shape Memory composite (SMC) material in the construction of an antenna design. Exemplary embodiments may include an omnidirectional antenna design.

Exemplary embodiments disclosed use shape memory composite material to construct Compactible antennas for free space communications between spacecraft, and ground stations or other spacecraft.

Exemplary embodiments include an antenna made of shape memory composite material. Exemplary embodiments permit the transition of the antenna from a deformed, stowed shape to a deployed shape. The deformed shape may be collapsed or otherwise define a smaller dimension or volume for storage and transport. In an exemplary embodiment, the shape memory composite material may have a remembered configuration such that the deformed shape retains energy to deploy or transition the shape memory composite to the deployed shape without outside intervention or applied force. For example, a mechanism may be used to impose an outside force to retain the shape memory composite material in the deformed configuration. Upon removal of the applied force, the shape memory composite material deploys.

In an exemplary embodiment, the shape memory composite material may be conductive to act as an antenna. The shape memory composite material may be conductive through material selections of the fibers, the resin to retain the fibers, additives to the fibers and/or resin, coatings, and other methods described herein. The fibers may be conductive. The resin may be conductive. Metallic or conductive powders, additives, or fillers may be added to the resin or filler between fibers. Metallic strands may be incorporated with or used exclusively as the composite fibres. Thin metallic foils may be wrapped or used to cover all or part of the members created by the shape memory composite material. Conductive paint or other coatings may be applied to all or part of a surface of the component created by the shape memory composite material.

DRAWINGS

DESCRIPTION

Figure 1:
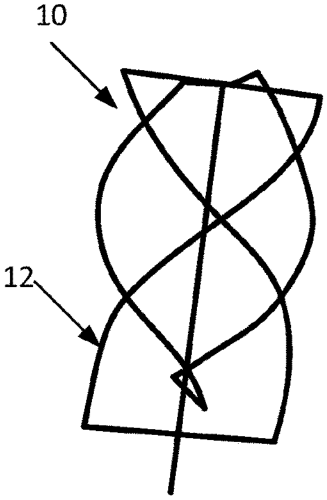
FIGS. 1-3 illustrate exemplary antenna shapes according to embodiments described herein.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments may use a dynamically deformable material as a support and deployment structure for supporting an electrically conductive material to create an antenna form geometry.

In an exemplary embodiment, the dynamically deformable material may include an electrically conductive material for creating an antenna form.

In an exemplary embodiment, the dynamically deformable material may not include an electrically conductive material, but may support an electrically conductive material in a desired form.

Exemplary embodiments may use an envelope contained around and/or supported by the dynamically deformable material. The envelope may be gas impermeable or semi-gas impermeable to inflate upon deployment of the antenna. The envelope may be inflated to assist the antenna to transition to a deployed configuration. The envelope may be inflated to release the antenna from a stowed configuration. The envelope may act as a substrate to support an electrically conductive material to create the antenna form.

Although embodiments of the invention may be described and illustrated herein in terms of specific antenna configurations, it should be understood that embodiments of this invention are not so limited, but are additionally applicable to different antenna configurations. Exemplary embodiments also disclosed include different combinations of the dynamically deformable material as a support, as including the conductive material for the antenna, as the spring support for deploying the antenna from a stowed configuration, as the support for an envelope that can support a conductive material for creating the antenna shape, as a support for the deployed configuration, and any combination thereof. Exemplary embodiments may include alternative features, such as a tear away surface, removable retraction or stowage material or cords, an envelope, one or more antenna shapes, one or more sleeves or envelopes, one or more support infrastructures made from shape memory material, a hub, one or more inflation mechanisms. Any feature, component, configuration, and/or attribute described for any one example may be used in combination with any other example. Accordingly, any step, feature, component, configuration, and/or attribute may be used in any combination and remain within the scope of the instant description. Features may be removed, added, duplicated, integrated, subdivided, or otherwise recombined and remain within the scope of the instant disclosure. The exemplary embodiments described herein are provided for sake of example only. Therefore, any antenna configuration may be used with or without an envelope according to embodiments described herein. Any antenna configuration may be used with or without a tear away or break away retention device according to embodiments described herein. Any antenna configuration may be used with an inflation mechanism according to embodiments described herein.

Although exemplary embodiments are shown and described with respect to creating omnidirectional antennas for free space communications between ground stations and other spacecraft, other applications are within the scope of the instant disclosure. For example, directional antennas are within the scope of the instant disclosure. Other uses are also within the scope of the instant application and not just space communications between spacecraft.

If constructed from copper or some other conductive metal, the antenna is rigid and its "footprint" cannot be reduced for stowage during launch. Exemplary embodiments described herein include shape memory components that can dynamically deform. Dynamic deformation as described and used herein includes non-structured deformation for stowage and/or deployment. Exemplary embodiments of the shape memory component may flex and bend or otherwise deform along a length of the shape memory component. The deformation may be along an entire length or portion of the shape memory component. The dynamic deformation can be folded into a smaller configuration, stowed in the SmallSat or other storage compartment, and released to expand to a deployed configuration. In an exemplary embodiment, the shape memory component comprises a remembered configuration. During use, exemplary embodiments may include a stowed configuration where the shape memory component may be retained through application of an outside force in the deformed shape. Upon removal of the outside force, such as a deformation force, the shape memory component expands to a remembered configuration. The remembered configuration may be the deployed configuration. Deployment may therefore be straightforward for a shape memory component structure since it merely requires that the mechanism constraining the shape memory component (such as the antenna) in the folded or stowed configuration be removed.

In an exemplary embodiment the shape memory component may comprise a shape memory composite. The shape memory composite may comprise fibers retained in a matrix or resin. The shape memory component may be conductive. To improve the antenna gain, the conductivity can be increased, such as by adding: (1) metallic powders to the matrix of the composite; (2) thin metallic foils wrapped around the shape memory composite component creating the antenna; (3) conductive paint applied to the surface of the shape memory component; and combinations thereof.

FIGS. 1-10 illustrate exemplary antenna shapes according to embodiments described herein. In an exemplary embodiment, the antenna structure 10, 20, 30, 40, 50, 60, 70, 80, 90, 100 may comprise a shape memory composite material 12, 22, 32, 42, 52, 62, 72, 82, 92, 102. The shape memory composite material may permit the antenna to collapse under imposition of an outside force in a non-structured fashion. The collapsed configuration may therefore by dynamically determined based on the storage compartment or the outside force applied. For example, the shape memory composite may be flexible or deformable along a length when a force is applied. The shape memory composite, however, may return to a remembered configuration, once the force is removed. In an exemplary embodiment, the shape memory composite may flex at multiple locations along a length of the member or along an entire length of the member. In an exemplary embodiment, the shape memory composite may return to a remembered configuration, such as linear, circular, ovoid, curved, parabolic, helical, spiral, or other predefined shape when the outside force is removed. The predefined shape may be the shape of the structure that is maintained without the use of an outside force. The predefined shape may be defined through the relationship and connections with one or more other shape memory composite materials, envelopes, and/or other support structures as described herein.

An exemplary shape memory composite material includes a base material of one or more of carbon fiber, Vectran, Kevlar, fiberglass, glass fibers, plastics, fiber metal. The base material may comprise strands. The stands may be generally aligned along a length of the structure, may include one or more aligned arrangements, may be wound or helically positioned, may be woven, or any combination thereof. The shape memory composite material may include a matrix around and/or between the base material. The matrix may be silicone, urethane, or epoxy. Exemplary shape memory composite materials are described in co-owned patent application U.S. Patent Publication No. 2016/0288453, titled "Composite Material". Exemplary embodiments include a high strain material to permit deformation. High strain materials generally have the capability to strain beyond 3% and not enter plastic deformation. In other words, the material may yield beyond 3%.

In an exemplary embodiment, the shape memory composite material includes a volume fraction ratio of fiber-to resin that may be controlled to achieve a desired shape memory retention even after long-term storage in a folded/packaged state. An exemplary fiber-to-resin volume fraction ratio is from 52 to 65, namely 52 percent to 65 percent fiber or 48 percent to 35 percent matrix or resin. The average fiber-to-matrix ratio is about 58 percent. The fibers may be carbon, Kevlar, Vectran, nylon, or otherwise described herein and the resin may be urethane, silicone or epoxy or otherwise described herein as the matrix.

In an exemplary embodiment, the member composed of the shape memory composite material may be conductive to define an antenna shape. All of a portion of the component may be conductive. The component may be conductive by incorporating a conductive material into the shape memory material. The component material may include a metallic powder, coating, wrapping, sheet, film, paint, strands, or combinations thereof. The conductive material may be in the fiber, resin, on the surface of the fiber, on the surface of the component material, or a combination thereof. In an exemplary embodiment, the shape memory composite component is conductive to create the antenna shape by wrapping the component in a thin sheet of copper. The copper sheet may be adhered or otherwise coupled to an exterior surface of the shape memory composite material shaft.

FIG. 1 illustrates an exemplary embodiment of an antenna configuration 10 in which the conductive material is shaped as a Quadrifilar (four helical conductors) Helical Antenna. As illustrates, the antenna structure includes shape memory members 12 that comprise a conductor. The conductive members define four helical strands wrapped about a central longitudinal axis. The central longitudinal axis may include a conductive shaft. Opposing ends of the quadrifilar may include radial extension coupling each helical strand to the longitudinal axis or central shaft at opposing ends of each helical strand. The helical strands may be circumferentially offset by 90 degrees. Having the helical strands as well as the central shape made of shape memory composite permits the entire structure to deform and flex in any non-structured or random configuration to fit within a desired storage space.

Figure 2:
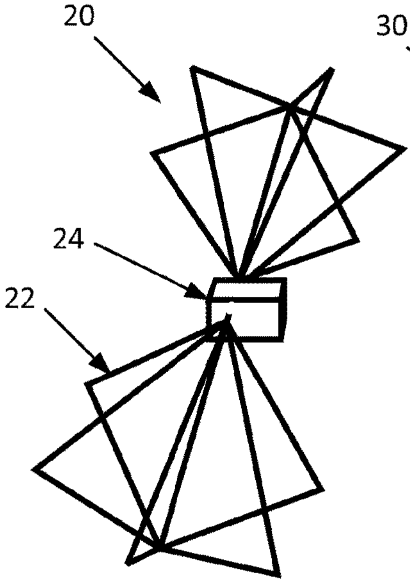

FIG. 2 illustrates an exemplary embodiment of an antenna configuration 20 defining a biconical antenna. As illustrated, the antenna may include a hub 24. Extending from opposing sides of the hub or center, is a longitudinal axis. The longitudinal axis may include a conductive shaft. As illustrated, five conductive members extend radially and longitudinally away from the hub on each side of the hub. The five members may extend radially outward to a distance and then extend radially inward toward to couple to the shaft or longitudinal axis. The portion of the conductive member that extends radially inward may extend only radially inward such that the conductive member defines part of a right triangle. The conductive member may also continue to extend longitudinally away from the hub as it extends radially inwardly, thus defining other bent or triangle shapes.

Figure 3:
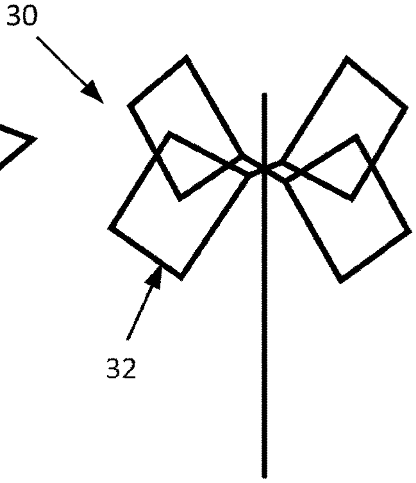

FIG. 3 illustrates an exemplary antenna configuration 30. The conductive material may be within the shape memory components 32 as described herein. The conductive material may define one or more rectangular, square, quadrilateral shape, or other geometric shape. The shapes may be positioned such that a plane of the shape includes or passes through a longitudinal axis. The shapes may be circumferentially offset and positioned about the longitudinal axis. The longitudinal axis may define or be a conductive shaft.

FIGS. 4-10 illustrate exemplary antenna configurations according to embodiments described herein including an envelope. Exemplary embodiments as illustrated show exemplary embodiments of a support structure as described herein in dashed lines. The support structure is illustrated in a different line type to distinguish the component parts for sake of illustration and to improve the understanding of the invention. The dashed line is not indicated to suggest or represent holes or apertures within the support structure, although the support structure may include such features. In an exemplary embodiment, as described herein, the support structure is gas impermeable.

In an exemplary embodiment, the antenna structure 40, 50, 60, 70, 80, 90, 100 may be supported by a support structure 46, 56, 66, 76, 86, 96, 106. The support structure 46, 56, 66, 76, 86, 96, 106 may be conductive or non-conductive. The support structure may provide other features for the antenna, such as shape support, signal effects, directional effects, storage retention, deployment actuation, or combinations thereof. In an exemplary embodiment, the support structure comprises a thin film that is flexible. The support structure may therefore be collapsible and/or deformable in the same or similar way as the antenna structure. The support structure may be a dielectric membrane. The support structure may be a fabric, mesh, or sheet. The support structure may be Kapton, Mylar, Teflon, cotton, or other dielectric and/or non-conductive material. Although shown as included with only a subset of the exemplary embodiments, the support structure may be used with any antenna configuration described herein. The support structure may be coupled to the shape memory composite material, the conductive components, other components of the antenna, or combinations thereof.

In an exemplary embodiment, the support structure 46, 56, 66, 76, 86, 96, 106 defines a thin surface. The support structures 46, 56, 66, 76, 86, 96, 106 may comprise flexible materials coupled to any combination of other additional support structures, support structure, shape memory composite components, and/or conductive components. In an exemplary embodiment, the support structure 46, 56, 66, 76, 86, 96, 106 defines a gas impermeable or semi-impermeable surface. The support structure may define an interior cavity. The support structure may be positioned to create a continuous and gas-impermeable surface around the interior cavity. In an exemplary embodiment, as described more fully herein, the support structure may be inflatable. In an exemplary embodiment, the support structure may be inflatable to assist in the deployment of the antenna structure. The support structure may be configured to vent the inserted fluid after inflation and/or may be configured to retain the fluid for a period of time after inflation. A gas impermeable surface may therefore include a surface that retains sufficient gas in order to assist with deployment and initial inflation but may vent gas thereafter.

Figure 4:
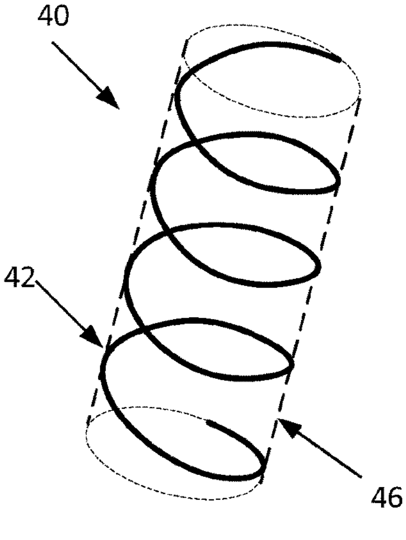
FIGS. 4-10 illustrate exemplary antenna configurations according to embodiments described herein including an envelope.
Figure 5:
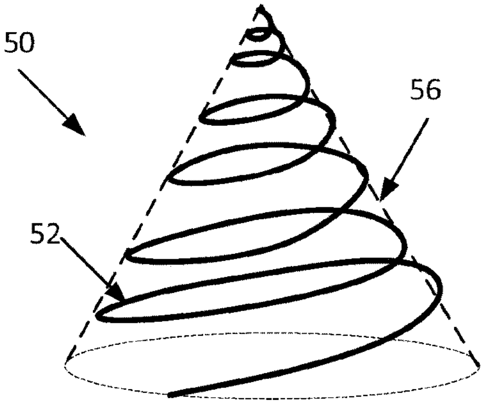
Figure 6:
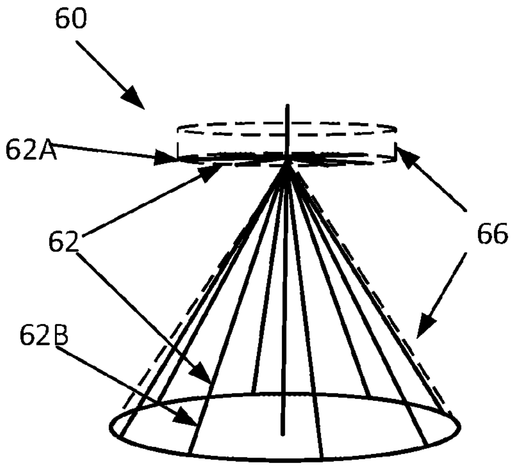

FIGS. 4-6 illustrate exemplary configurations in which the shape memory component 42, 52, 62 are positioned on a surface of the support structure 46, 56, 66. FIG. 4 illustrates an exemplary circular cylindrical support structure 46 having one helical conductive component made of a shape memory composite 42. Other helical configurations may also be added to the support structure (such as a configuration of FIG. 1). FIG. 5 illustrates an exemplary circular conical support structure 56 having one helical conductive component made of shape memory composite 52 that is coupled to the support structure such that a diameter of the helical conductive component tapers from one end to an opposite end of the antenna. The conical support structure may come to a point or may terminate toward the smaller diameter end before coming to a point. Other helical configurations may also be added to the support structure.

Exemplary embodiments may also use a combination of dielectric and/or non-conductive layers to create complex antenna configurations with leads that may overlap each other but may or may not contact one another. For example, a first cylindrical support structure may be used with conductive material one either interior or exterior surface. A second cylindrical support structure may be positioned over or inside the first cylindrical support structure enclosing conductive material between the first layer and the second layer. Another side of the second cylindrical support structure on a side opposite the side contacting the enclosed conductive material may also include conductive material. The antenna may therefore include a first conductive layer defining a first pattern, a non-conductive and/or dielectric layer, a second conductive layer defining a second pattern. The antenna may include additional combinations of conductive layers and non-conductive and/or dielectric layers. The different layers may be used to create complex antenna configurations and different conducting patterns that may be electrically coupled and/or electrically isolated.

FIG. 6 illustrates an exemplary configuration having a plurality of support structures 66 and conductive members made of shape memory composite components 62. As illustrated, different antenna shapes may be created. As seen in FIG. 6, a first antenna shape portion defines a plurality of radially extending conductive components 62A. A second antenna shape portion defines a plurality of radially and longitudinally extending conductive components 62B that create a generally conical configuration. The first support structure may define a generally cylindrical shape, while the second support structure may define a generally conical shape. Each of the conductive components may be coupled to a surface of the support structure. The support structures may define separate volumetric cavities. The cavities of the support structures may be in communication or may be isolated. The volumetric cavities may be used to deploy and/or support the antenna according to the deployment method described herein.

Figure 7:
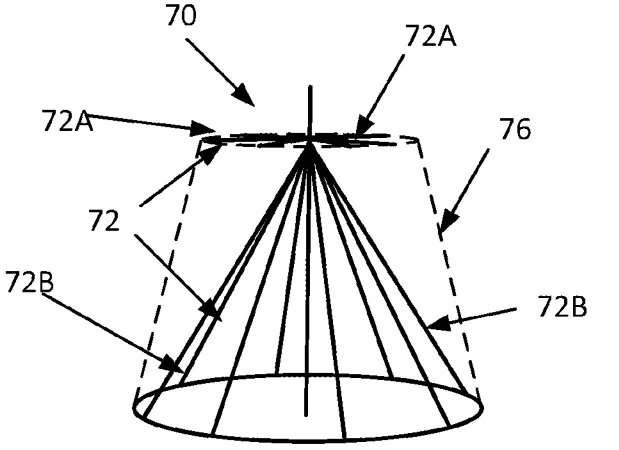

FIG. 7 illustrates an exemplary antenna structure 70 that has the same conductive pattern as the antenna structure 60 of FIG. 6. The shape of the support structure 76 however is different to support the antenna conductive shape memory conductive components 72. As illustrated in FIG. 7, at least some of the conductive components and/or shape memory composite components or portions thereof are off of the surface of the support structure and contact only a portion to support the support structure. As illustrated, the support structure 76 defines a partial or truncated cone. The radial conductive and/or shape memory composite components 72A are positioned along their entirety along the surface of the support structure 76. However, the radial and longitudinal conductive and/or shape memory composite components 72B extend within an interior of the support structure, away from the surface of the support structure 76. The conductive and/or shape memory composite components 72B couple at their terminal ends to an edge of the support structure 76.

Figure 8:
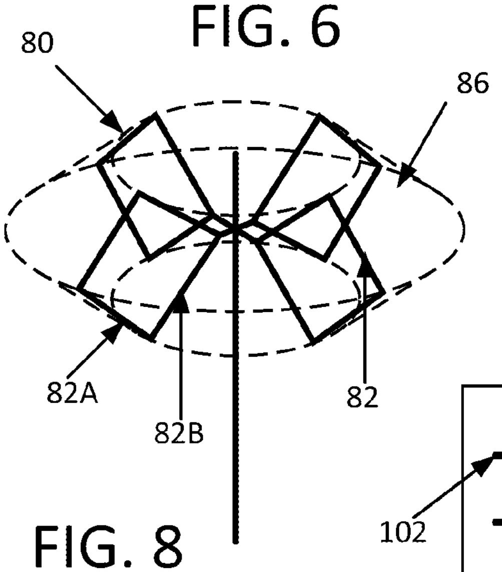

FIG. 8 illustrates another exemplary antenna structure 80 having a support structure 8. The antenna structure 80 may be similar to that of FIG. 3 having similar conductive and/or shape memory composite components 82 as the components 32. The antenna structure 80 may also include a combination of first component segments 82A that extend along a surface of the support structure 86 and second component segments 82B that extend within an interior of the support structure 86. A person of skill in the art would appreciate that other support structures 86 may also be used. For example, a toroid support structure could be used that has a cross sectional shape approximating the conductive and/or shape memory composite component segments (i.e. quadrilateral as illustrated).

Figure 9:
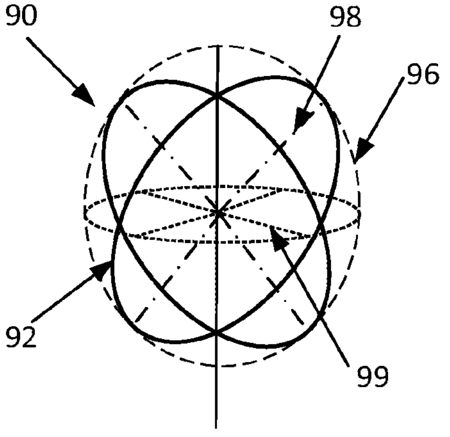
Figure 10:
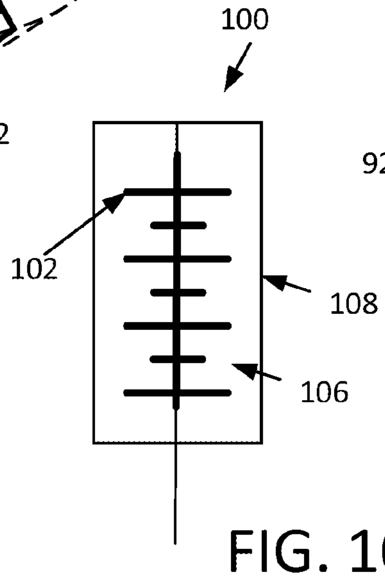

As illustrated in FIGS. 9-10, the antenna may be defined by conductive traces formed on the support structure. The traces may be from a conductive material. The traces may be from a coating, fiber, wire, paint, or other structure supported on and/or in and/or through the support structure. The design of the antenna structure 90, 100 may be separated such that design considerations for the support may be maximized while design considerations for the antenna may also be maximized. By decoupling the conductive material from the shape memory composite support structure, the design considerations may both be improved. For example, fewer shape memory composite components may be use, thus minimize the stowage configuration, while maintaining the response of the antenna with appropriate number of conductive components. For example, the shape memory composite components 98, 108 may be selected to improve the support and/or deployment of the antenna structure 90, 100, while the conductive components 92, 102 may be selected and positioned on the support structure 96, 106, shape memory composite member, or intermediate members to improve the antenna function.

As illustrated in FIG. 9, the antenna structure 90 may also include additional support structures 99. The additional support structures may comprise flexible materials coupled to any combination of other additional support structures, support structure, shape memory composite components, and/or conductive components. The additional support structures may be used to support conductive components that may or may not be positioned on the support structure. In an exemplary embodiment, the additional support structures may be strings, elongated flexible members, wires, bands, or combinations thereof. The additional support structures may be used to reinforce one or more of the additional support structures, support structure, shape memory composite components, and/or conductive components. The additional support structures maybe used to influence a shape, such as the deployed shape, of any combination of the additional support structures, support structure, shape memory composite components, and/or conductive components. For example, as seen in FIG. 9, additional support structures 99 may be used to reinforce the support structure 96 and create a reduced diameter section by coupling to the additional support structure 99 and/or support structure 96 to an interior of the antenna structure 90. The additional support structures may therefore be used to create complex shapes for use with novel antenna designs.

In an exemplary embodiment, the shape memory composite material may be integrated with the support structure. The shape memory composite material may create the support structure.

In an exemplary embodiment, the shape memory composite material may create a framework to which the support structure is attached. As described herein the shape memory composite may be within or coupled along its entirety to the support structure. The shape memory composite components may also be coupled to the support structure along a portion or point of the shape memory composite component. A combination of support structure and/or shape memory composite components may be used.

In an exemplary embodiment, a conductive material may be incorporated with the shape memory composite component. The conductive material may be as described herein within the shape memory composite and/or on a surface thereof.

In an exemplary embodiment, the conductive material may be support by or on the support structure. The conductive material may be positioned on the support structure in any fashion, such as being on a surface of the support structure, within the support structure, and/or coupled to the support structure. In an exemplary embodiment, the conductive material may be painted, coated, positioned on, woven into, or otherwise coupled to the support structure. For example, the conductive material may include thin sheet metal of copper. The sheet metal may be patterned and positioned on the surface of the support structure and coupled thereto. As another example, the conductive material may be fibers of thin copper wires. The fibers may be woven into or coupled to the support structure.

In an exemplary embodiment, additional structures may be used to deform and/or support the support structure and/or the conductive component. In an exemplary embodiment, additional structures may include flexible components, but may or may not also be shape memory. Additional support structures may couple to the shape memory components and/or the support structure to couple components parts together, define a deployed shape, support or create additional attachment points between component parts, influence deployment, or otherwise contribute to the design of the antenna structure.

Exemplary embodiments described herein may use any combination of the features described herein. In an exemplary embodiment, antenna structure may include any combination of the support structure, shape memory composite components, conductive components, additional structures, whether separate component parts and/or integrated in one or more ways such that a single component part functions as more than one component part. Exemplary embodiments include any combination of the support structure, shape memory composite components, conductive components, and additional structures comprise flexible components. Flexible components comprise a component part that may bend at any point or along a length. In an exemplary embodiment, any combination of the support structure, shape memory composite components, conductive components, and additional structures permit non-structured dynamic deformation. As described herein, the non-structure dynamic deformation permits flexing that may be defined by the external force deforming the component and not in an pre-configured or structurally limited fashion.

Figure 11A:
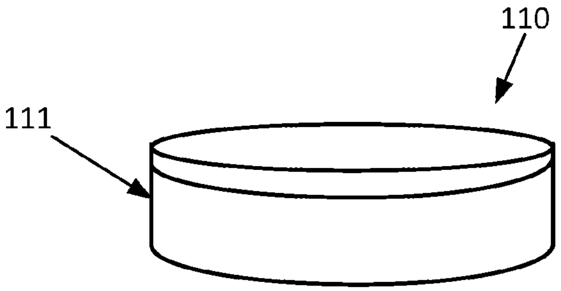
FIGS. 11A-11C illustrate an exemplary deployment sequence according to embodiments described herein.
Figure 11B:
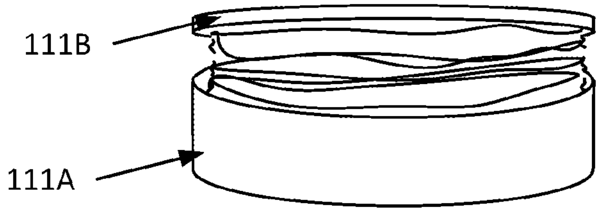
Figure 12:
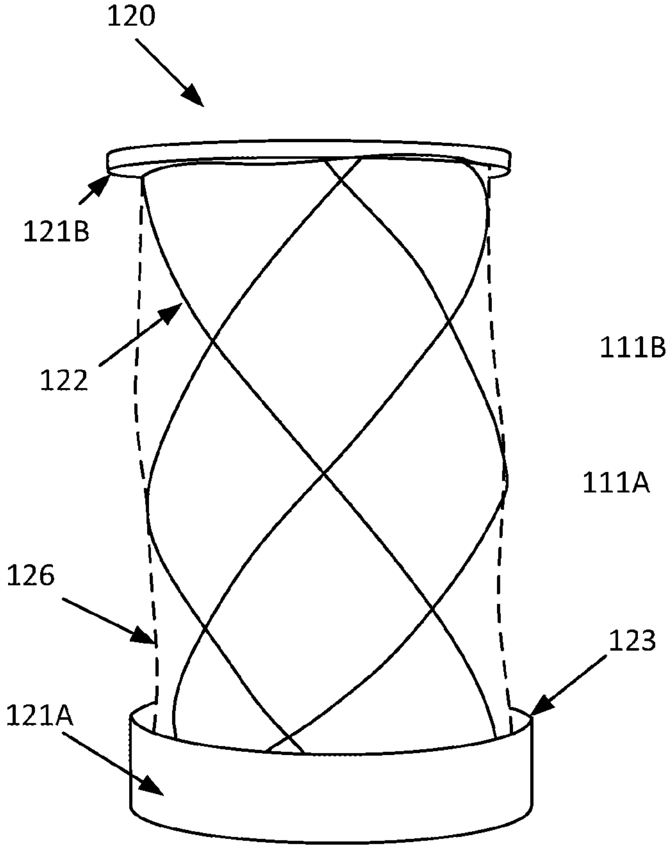
FIG. 12 illustrates an exemplary configuration according to embodiments described herein.

FIGS. 11A-12 illustrate exemplary embodiments of an antenna system 110, 120 including a housing 111, 121A, 121B. The housing may be used to impose an outside force to retain the antenna in a stowed configuration. Exemplary embodiments of the housing can be opened to remove the deformation force and permit the shape memory component to expand. The system may include an opening mechanism to open the housing. The opening mechanism may include a hinge, pyrotechnic door, explosive bolts, failure component, or any other system for constraining the antenna in its stowed state. In an exemplary embodiment, the failure component is configured to withstand an applied force of at least a threshold amount. The failure component is configured to intentionally fail upon application of a force above the threshold amount. The failure component may be configured to apply the deformation force for restraining the shape memory component. The system may be configured to impose an additional force to deploy the antenna configured to overcome the threshold amount and fail the failure component to release the antenna.

Figure 11C:
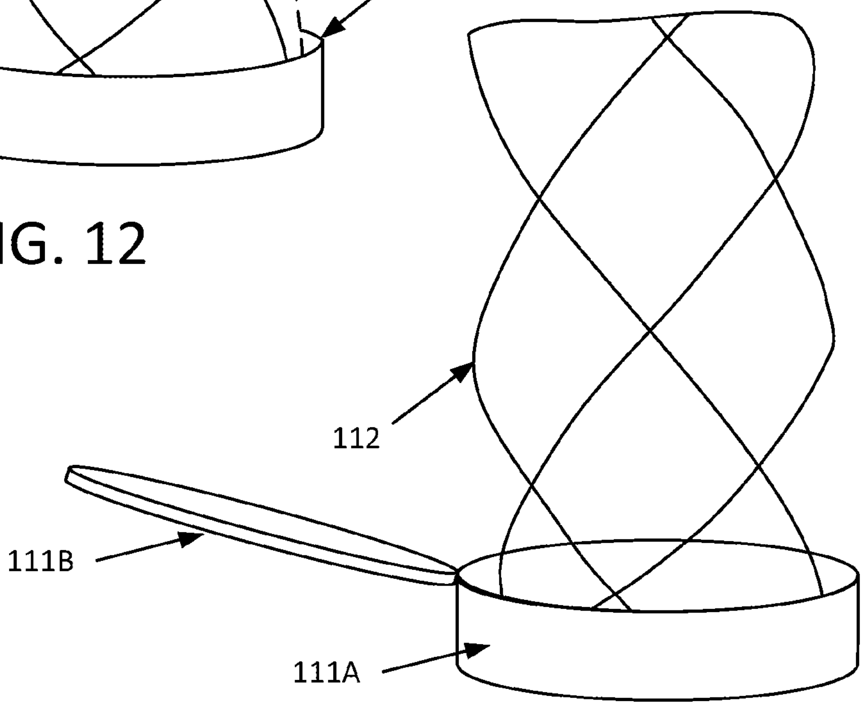

FIGS. 11A-11C illustrate an exemplary deployment sequence according to embodiments described herein.

Exemplary embodiments may include a stowed configuration as seen in FIG. 11A in which the antenna structure 112 is retained in the stored position having a reduced storage volume through application of an outside force; and a deployed configuration as seen in FIG. 11C in which the antenna structure is fully deployed having a larger volume when the outside force is removed. In other words, the remembered or biased configuration may be a deployed configuration in which the antenna structure is configured for use as a deployable quadrifiliar (such as seen in FIG. 1) or other small antenna shape (as seen in FIGS. 2-13B or otherwise configured according to embodiments described herein). The antenna structure 112 may be positioned within the housing 111 in the stowed configuration in a non-structured deformed configuration.

As seem in FIG. 11B, the housing 111 may be opened or otherwise configured to remove the retaining force on the antenna structure 112. In an exemplary embodiment, the housing may include a first part 111A and a second part 111B in which the first part and second part may be separable. The first part 111A may be coupled to the second part 111B in the stowed configuration to impose the deformation force in order to retain the antenna structure in the stowed configuration. The first part 111A may be opened and/or separated from the second part 111B. If opened, the first part 111A may be retained to the second part 111B such as by a hinge or other connection. As illustrated in FIG. 12, the first part 121A may be fully separated from the second part 121B. The first part and/or second part may create part of the support infrastructure and/or hub for the antenna system.

As seen in FIG. 11C, once the deformation force is removed, the antenna structure 112 may fully deploy. Deployment may be through removal of the deformation force, such as imposed by a retaining device on the shape memory composite components. The retaining device may be the housing or part of the housing and/or may be in another component part as described herein.

FIG. 12 illustrates an exemplary configuration according to embodiments described herein. FIG. 12 illustrates an exemplary antenna structure 120 comprising shape memory composite components 122 and support structure 126. The antenna structure 120 may include an exterior housing configured to enclose the shape memory composite components and/or support structure. The exterior housing 123 may include portions that are separable into a first portion 121A and a second portion 121B. The housing may be coupled together through a failure interface. For example, the failure may be through application of a substance, explosive, ignition, or additional force. The failure interface may be configured to retain the shape memory composite components in a deformed configuration to be stored. The failure interface may be configured to fail under a desired condition. Upon failure, the shape memory composite material may return to a remembered condition and deploy the antenna structure to a deployed configuration.

In an exemplary embodiment, the support structure may define a gas impermeable cavity. At deployment, the support structure may be injected with a fluid to inflate the support structure. The inflation of the support structure may be used to overcome the failure interface and release the antenna structure for deployment. Inflation of the support structure may assist in the shape memory composite material in deploying to a remembered configuration. The inflation may be used to counteract any creep or deformation that may have occurred in the antenna structure during storage for long periods of time. The support structure may thereafter loose inflation fluid over time. However, the shape memory composite material may thereafter sufficiently support the antenna structure such that additional inflation fluid is not required to retain the shape of the antenna structure for long term deployment. Therefore, the deployed configuration defining the antenna shape may be retained with the shape memory component after a deflation of the support structure or inflatable sleeve.

Figure 13A:
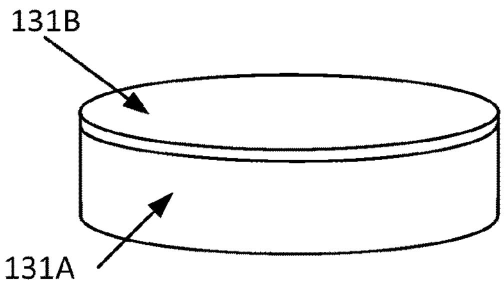
FIGS. 13A-13C illustrate an exemplary deployment sequence according to embodiments described herein.
Figure 13B:
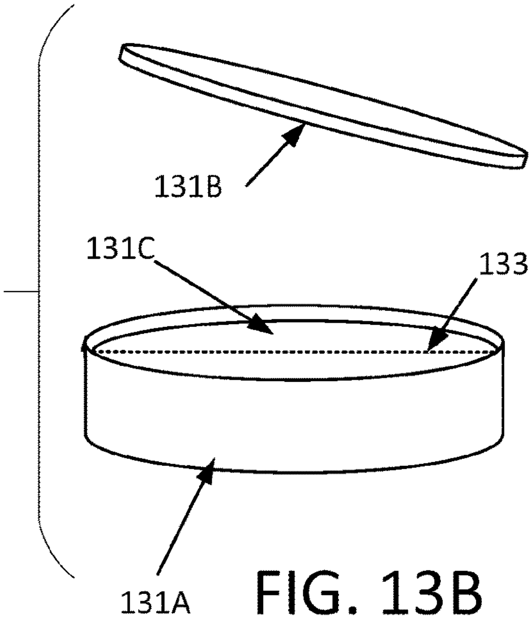
Figure 13C:
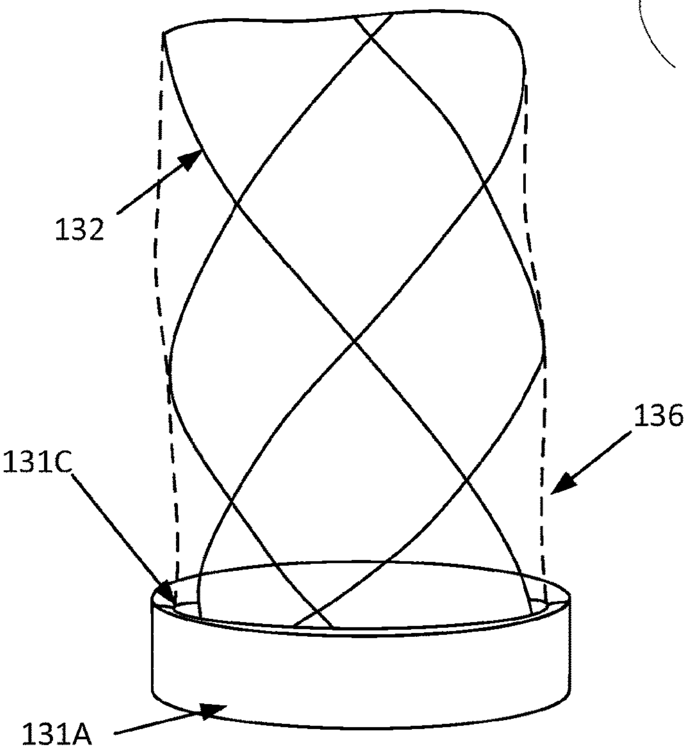

FIGS. 13A-13C illustrate an exemplary deployment sequence according to embodiments described herein. Similar to the deployment represented by FIGS. 11A-11C, the antenna structure may include shape memory composite component 132 that is in a stowed configuration upon application of a deformation force. Upon removal of the deformation force, and/or with use of a support structure defining an envelope receiving an inflation fluid, the antenna structure deploys and the shape memory composite components return to a remembered configuration.

In an exemplary embodiment, the antenna structure is retain in a housing 131A, 131B as seen in FIG. 13A. The housing may be a rigid structure for retaining and applying a retention force on the antenna structure, including the shape memory composite components. FIG. 13A illustrates that the housing may include a first part 131A for partially enclosing the antenna structure, with a second part 131B acting as a cover or lid to the first portion 131A. The lid may be used to support or impose a retention force on the antenna structure for long term storage.

When ready for use and transport to space, the second part 131B may be removed from the first part 131A as seen in FIG. 13B. The first part 131A may therefore define a first retention device for long term storage. Long term storage includes herein unknown durations of time, which may be on the matter of minutes, hours, days, weeks, months, or years. In an exemplary embodiment, a second retention device 131C imposes the deformation force to continue to retain the antenna structure in the stowed configuration. The second retention device 131C may be used for short term retention of the antenna structure. In an exemplary embodiment, short term may be for a known finite duration, even if the short term retention may be on the order of hours, weeks, months, or even years. As illustrated, the second retention device 131C includes a failure interface 133. The failure interface may be configured to tear, break, dissolve, or otherwise fail and permit the antenna structure to return to a remembered configuration. As illustrated, the second retention device 131C may define a thin covering sheet that includes a weakened portion to act as the failure device 133. The weakened portion may include a material portion that is perforated and therefore withstands a lower external force. Other configurations may also be used and remain within the scope of the instant disclosure, such as, for example, thinner material section, perforations, tears, degradable material, temperature sensitive material, and combinations thereof.

FIG. 13C illustrates a deployment of the antenna structure, when the shape memory material 132 overcomes the deformation force of the retaining device 131C, such that the retaining device 131C fails and the deformation force is removed. In an exemplary embodiment, the antenna structure includes a support structure 136 defining an inflation sleeve. The inflation sleeve may be inflated through injection of one or more fluids, such as gas, to apply an additional force on the retaining device 131C and overcome the failure interface 133. The injection of fluid into the inflation sleeve may therefore release the antenna structure from the stowed configuration to permit the shape memory composite components to return to a remembered configuration. The injection of fluid into the inflation sleeve may also assist the shape memory composite components to return to a remembered configuration. The inflation sleeve may be inflatable or retain the inflation gas for a period of time to overcome or counteract potential creep in the shape memory composite components or other shape retention any of the components the antenna structure may experience from longer duration times.

Figure 14:
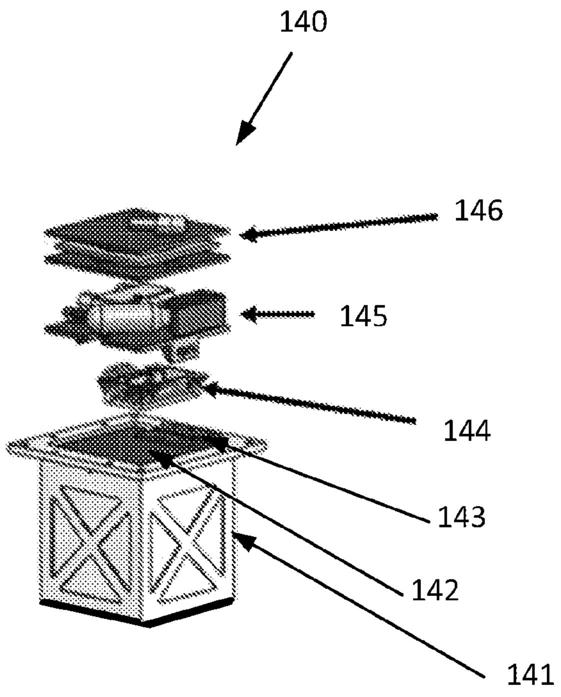
FIG. 14 illustrates an exemplary system according to embodiments described herein.

FIG. 14 illustrates an exemplary system according to embodiments described herein. As shown, the antenna system 140 may include one or more components within a housing 141. The housing 141 may be used for long term storage. The housing may include a door 142. The door 142 may impose a deformation force on the antenna structure to retain the antenna in a stowed configuration. The housing, and/or its door may be used for providing an additional retention force in additional to a deformation force imposed by another component part as described herein. The additional retention force may be used for long term storage and/or provide additional environmental protection for the antenna assembly while it is stored in an Earthly environment. The housing may therefore be sealed between the housing 141 and the door 142. The door may be fully removable or simply openable such as with hinge, 143.

Exemplary embodiments of the system may include electronics for controlling portions of the system. For example, 144 sequencer and/or electronic may include communication systems; interface systems for coupling to other electronic system; controllers; sequencer; and combinations thereof. The sequencer and/or electronics may communicate with controllers, and/or permit the actuation of one or more of the system components described herein. For example, a controller may interface with the fluid injection system to inflate the inflation envelope as described herein. For example, a controller may interface with the release mechanism for the antenna structure for removing the deformation force and permitting the antenna structure to return to a remembered configuration. This may be by opening the door 142 of the housing, or by firing a pyrotechnic charge to remove another failure component, by inflating the inflation envelop with a fluid to overcome a failure interface, or combinations thereof.

Exemplary embodiments of an antenna system may include one or more actuators 145 for controlling one or more components of the system. As illustrated, an exemplary actuator may include a compressed gas canister and controller. The compressed gas canister may be in fluid communication with an interior of a cavity of an inflation envelope created by a support structure as described herein.

Exemplary embodiments of an antenna system may include the antenna structure 146. The antenna structure 146 may include one or more component parts including any combination of a shape memory composite component, conductive component, support structure, housing, additional support structures, etc.

Antenna designs according to embodiments described herein may be capable of sending and receiving circularly polarized waves. Since the magnetic field generated by charged particles in the ionosphere induce Faraday rotation of linearly polarized beams, circularly polarized waves may be preferable to travel through the ionosphere.

Antenna designs according to embodiments described herein may be omnidirectional to allow for arbitrary satellite orientations. As examples only, different antenna designs are provided and described herein. Some examples may provide both circularly polarized waves and/or may be omnidirectional. For example, exemplary antenna designs that may provide both circularly polarized waves and be omnidirectional may include electrically conductive components in a helical shape and/or may define a biconical horn. Exemplary embodiments may use polarizing feeds. An exemplary helical design includes a quadrifilar (4 helical conductors) Helical Antenna, as illustrated in FIG. 1. An exemplary biconical antenna design is illustrated in FIG. 2.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Conditional language used herein, such as, among others, "can," "could," "might," "may," "e.g.," and the like, unless specifically stated otherwise, or otherwise understood within the context as used, is generally intended to convey that certain embodiments include certain features, elements and/or states. However, such language also includes embodiments in which the feature, element or state is not present as well. Thus, such conditional language is not generally intended to imply that features, elements and/or states are in any way required for one or more embodiments or that one or more embodiments necessarily exclude components not described by another embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item.

As used herein, the terms "about," "substantially," or "approximately" for any numerical values, ranges, shapes, distances, relative relationships, etc. indicate a suitable dimensional tolerance that allows the part or collection of components to function for its intended purpose as described herein. Numerical ranges may also be provided herein. Unless otherwise indicated, each range is intended to include the endpoints, and any quantity within the provided range. Therefore, a range of 2-4, includes 2, 3, 4, and any subdivision between 2 and 4, such as 2.1, 2.01, and 2.001. The range also encompasses any combination of ranges, such that 2-4 includes 2-3 and 3-4.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

The invention claimed is:

1. An antenna structure, comprising: a base structure comprising a shape memory component; and a conductive component; and a support structure creating an inflatable sleeve, wherein the base structure and the conductive component contact the support structure and the support structure is separate from and is contained around and coupled to the shape memory component; a storage device configured to impose a deformation force on the base structure to retain the base structure in a stowed configuration; and a failure device coupled to the storage device, the failure device configured to break by the inflation of the inflatable sleeve and release the base structure from the stowed configuration.

2. The antenna structure of claim 1, wherein the support structure is contained around and coupled to the shape memory component.

3. The antenna structure of claim 2, wherein the antenna structure has the stowed configuration and a deployed configuration, and the shape memory component is non-structurally deformed in the stowed configuration.

4. The antenna structure of claim 3, wherein the conductive component is a conductive material on an exterior surface of the shape memory component.

5. The antenna structure of claim 3, wherein the support structure comprises a gas impermeable material and is configured to inflate to release the antenna structure from the stowed configuration.

6. The antenna structure of claim 5, wherein the shape memory component comprises a plurality of shape memory components creating four helical curves to define a quadrifillar antenna.

7. The antenna structure of claim 5, wherein the shape memory component comprises a plurality of shape memory components defining a biconical antenna.

8. The antenna structure of claim 2, wherein the antenna structures comprises the stowed configuration and a deployed configuration and the antenna structure further comprises a restraining mechanism to retain the antenna structure in the stowed configuration during storage.

9. The antenna structure of claim 8, wherein the base structure in the stowed configuration is flexible and retained in the stowed configuration through application of an outside force and transitions to the deployed configuration automatically upon removal of the outside force.

10. A method of deploying an antenna structure, comprising: storing the antenna structure having a shape memory composite component, a conductive component, and a support structure creating an inflatable sleeve in a stored configuration, wherein the inflatable sleeve is separate from and is contained around and coupled to the shape memory component; inflating the inflatable sleeve with an inflation gas to transition the antenna structure from the stored configuration to a deployed configuration defining an antenna shape; retaining the deployed configuration defining the antenna shape with the shape memory component; and breaking a failure device by the inflation of the inflation sleeve, wherein the failure device is coupled to a storage device that imposed a deformation force on the antenna structure to retain the antenna structure in the stored configuration.

11. The method of claim 10, wherein the antenna shape is configured to provide both circularly polarized waves and be omnidirectional.

12. The method of claim 11, further comprising applying the deformation force to the antenna structure to non-structurally deform the shape memory composite component.

13. The method of claim 12, further comprising retaining the deployed configuration defining the antenna shape with the shape memory component after a deflation of the inflatable sleeve.

14. The method of claim 13, further comprising venting the inflation gas after deployment.

15. The method of claim 14, further comprising using the deployment of the inflatable sleeve to deploy the shape memory material to a remembered configuration.

16. The method of claim 15, wherein the deployment of the inflatable sleeve is used to overcome creep or deformation resulting from storage of the antenna structure.

17. The method of claim 10, wherein the support structure is contained around and coupled to the shape memory component so that inflation of the inflatable sleeve fully deploys the antenna structure.

18. The method of claim 10, further comprising applying the deformation force to the antenna structure to non-structurally deform the shape memory composite component and retain the antenna structure in the stored configuration.

19. The method of claim 18, wherein the shape memory composite component in the stored configuration is flexible and retained in the stored configuration through application of the deformation force and the method further comprises automatically transitioning the antenna structure toward the deployed configuration upon removal of the outside force.

20. The antenna structure, comprising:

a base structure comprising a shape memory component; and a conductive component;

a support structure creating an inflatable sleeve, wherein the base structure and the conductive component contact the support structure;

a storage device configured to impose a deformation force on the base structure to retain the base structure in a stored configuration; and a failure device coupled to the storage device, the failure device configured to break by the inflation of the inflatable sleeve and release the base structure from the stored configuration.

21. A method of deploying an antenna structure, comprising:

storing the antenna structure having a shape memory composite component, a conductive component, and a support structure creating an inflatable sleeve in a stored configuration;

applying a deformation force to the antenna structure to non-structurally deform the shape memory composite component;

inflating the inflatable sleeve with an inflation gas to transition the antenna structure from the stored configuration to a deployed configuration defining an antenna shape;

breaking a failure device by the inflation of the inflation sleeve, wherein the failure device is coupled to a storage device that imposed the deformation force on the antenna structure to retain the antenna structure in the stored configuration; and retaining the deployed configuration defining the antenna shape with the shape memory component.

* * * * *